United States Patent
Domba

[15] 3,700,844
[45] Oct. 24, 1972

[54] QUATERNARY FLUORSILICON DISPERSANT

[72] Inventor: Elemer Domba, Olympia Fields, Ill.

[73] Assignee: Nalco Chemical Company, Chicago, Ill.

[22] Filed: May 7, 1971

[21] Appl. No.: 141,420

[52] U.S. Cl. ......260/404.5, 252/363.5, 260/561 HA, 260/448.8 R
[51] Int. Cl. .............................................C07c 103/30
[58] Field of Search ....................260/404.5, 448.8 R

[56] References Cited

UNITED STATES PATENTS 3,012,006  12/1961  Holbrook et al....260/448.8 X

*Primary Examiner*—Lewis Gotts
*Assistant Examiner*—Ethel G. Love
*Attorney*—John G. Premo, Charles W. Connors and Edward A. Ptacek

[57] ABSTRACT

Surface active agents are produced by forming quaternary fluorosilicon compounds by reacting perfluoroalkyl esters with tertiary diamines.

2 Claims, No Drawings

QUATERNARY FLUORSILICON DISPERSANT

This invention relates in general to a new series of chemical compounds which are surface-active or cationic agents. The invention relates in particular to a new series of quaternary ammonium compounds which are adapted for use as wetting, dispersing and emulsifying agents, and to a process for the preparation of such compounds and to compositions containing them.

OBJECTS

Accordingly, it is a general object of the present invention to provide an entirely new series of quaternary ammonium compounds which can be prepared from diamines.

It is another object to provide a new series of quaternary ammonium compounds which show an increased stability, a wide range of solubility in water and organic solvents and improved surface active characteristics.

It is, therefore, another object of this invention to provide a new composition of matter comprising a fluorocarbon compound.

It is a further object of this invention to provide a new, easily dispersible fluorocarbon.

Another object of this invention is a method of easily dispersing fluorocarbon.

Still another object is to provide an easy method of applying the fluorochemical to the solid material using an aqueous bath.

Other objects will be apparent to those skilled in the art.

THE INVENTION

The quaternary polyfluoro-alkyl silicon compound of this invention can be represented by the formula:

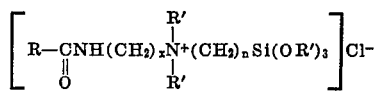

where R is a perfluoroalkyl radical having from one to 12 carbon atoms in chain length; R' is a hydrocarbon radical having from one to six carbon atoms in chain length; X is an integer ranging from 2 to 10; n is an integer selected from the group consisting of 2 and 3. The hydrocarbon and perfluoroalkyl radicals can be either straight or branched chain.

Preferably, the quaternary polyfluoro-alkyl compound has the formula:

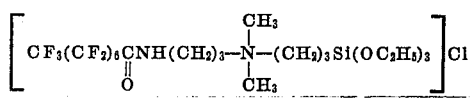

These quaternary polyfluoro-alkyl silicon compounds polymerize in water.

STARTING MATERIALS

One of the starting materials is the perfluoro-alkyl ester having the general formula:

where $R_1$ is an alkyl radical selected from the group consisting of methyl and ethyl; and R is a perfluoroalkyl radical having from one to 12 carbon atoms. Preferably the ester is perfluoro-octanoic methyl ester. The ester could also preferably be:

The other starting material is an amine having the following formula:

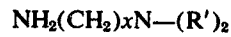

where R' is a hydrocarbon radical having from one to six carbon atoms in chain length and x is an integer ranging from 2 to 10. Preferably the amine has the formula:

To form the reaction product, the amine and the ester are reacted in equimolar quantities in a water-free system. When the exothermic reaction subsides, heat is applied to reach a temperature of from 60° to 80° C. and vacuum is applied to remove the alcohol. The reaction product is recovered. The reaction can be exemplified by the following general and specific equations:

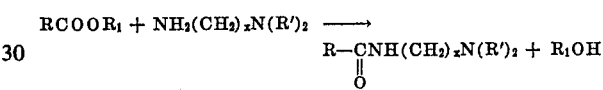

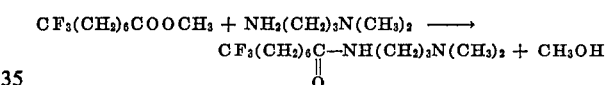

The yields are practically quantitative.

The quaternary compound is synthesized by reacting the above compound with chloromethyl or chloropropylsilane in dimethyl formamide (DMF). For example:

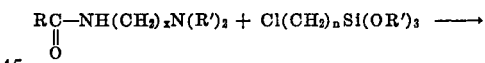

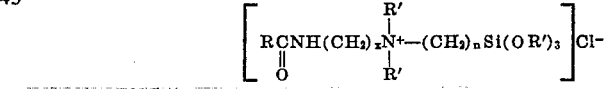

Preferably the following equation shows the reaction:

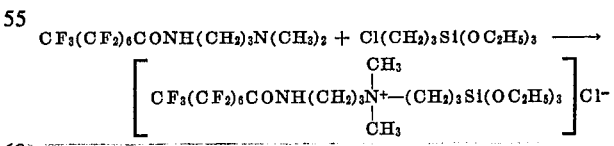

The above reaction was carried out in the presence of DMF as the solvent and under a nitrogen blanket. Reflux was maintained for 2 to 10 hours, or preferably 6 to 10 hours. The solvent was removed by vacuum. The residue is the product and is completely water-soluble.

An example of an illustrative preparation follows:

EXAMPLE I

To one mole of an amine having the formula:

$$NH_2(CH_2)_3N(CH_3)_2$$

there was added in small portions with frequent stirring, one mole of perfluoro-octanoic methyl ester. An immediate exotherm takes place. When the exotherm subsided, the reaction was heated to 70° C. for an hour. Vacuum was applied to remove methanol. The product is believed to have the following formula:

$$CF_3(CF_2)_6\underset{\underset{O}{\|}}{C}NH(CH_2)_3N(CH_3)_2$$

One-tenth of a mole of the reaction product produced above from the amine and ester was dissolved in 150 milliliters of dimethyl formamide. One-tenth of a mole of chloropropyl trimethoxysilane was added. The mixture was heated to reflux. Refluxing was maintained for 5 hours. The solvent was removed by vacuum. The residue product was recovered. The final product is believed to have the following formula:

$$[CF_3(CF_2)_6\underset{\underset{O}{\|}}{C}NH(CH_2)_3\underset{\underset{CH_3}{|}}{\overset{\overset{CH_3}{|}}{N^+}}(CH_2)_3Si(OC_2H_5)_3]Cl^-$$

The product from Example I was found to be completely water-soluble. It was also found to impart oil repellency to solid articles. These quaternary products can also be used with polymers or mixtures of polymers. These quaternary products have also been found very useful as oil repellents used with fluorinated or non-fluorinated polymers of silicon. Copolymerization could also be easily accomplished to produce novel products.

The quaternary product was also added to acetone and other ketones in ranges from 0.01 to 1 percent by weight. Polyvinylidene fluoride was then dissolved in the acetone and diluted with water without precipitation. This shows the dispersing ability of the quaternary product, since without the presence of the quaternary product, precipitation occurred. Generally for dispersability, from 0.01 to 1.0 percent by weight of the quaternary compound is used.

The dispersing and emulsifying powers of these new compositions give rise to many interesting uses. They may be utilized for converting liquid or solid substances normally insoluble in water, such as hydrocarbons, higher alcohols, pitches, and pitchy substances, and synthetic resins into stable emulsions or dispersions. They are useful in preparing emulsions of wax and wax-like compositions which are used as leather dressings or floor polishes. They may be used to prepare artificial dispersions of crude, vulcanized, or reclaimed rubber. They may be employed for preparing emulsions of the water-in-oil type such as emulsions of water in such organic solvents as are sued in the dry cleaning industry.

These compositions may be used for enhancing the spreading and penetrating power of parasiticides. They may be employed in agricultural sprays alone and in combination with the ordinary insecticides and fungicides and germicides.

These compositions may be employed as detergents in several different relations. They may be used in combination with metal cleaning compounds in neutral or acid liquors. They may be used for paint, varnish and lacquer cleaners. They may advantageously be employed as cleansing agents in hard water and where a fatty or oily film resists the ordinary cleansing media. They may be used as soaps in hard water baths, since these compositions do not form precipitates so readily in hard waters as soaps and Turkey red oils.

What I claim and desire to protect by Letters Patent is:

1. A fluorosilicon quaternary compound having the formula:

$$[R-\underset{\underset{O}{\|}}{C}-NH(CH_2)_x\underset{\underset{R'}{|}}{\overset{\overset{R'}{|}}{N^+}}-(CH_2)_nSi(OR')_3]Cl^-$$

where R is a perfluoroalkyl radical having from one to 12 carbon atoms in chain length; R' is a hydrocarbon radical having from one to six carbon atoms in chain length; x is an integer ranging from 2 to 10; and n is an integer selected from the group consisting of 2 and 3.

2. The fluorosilicon quaternary compound of claim 1 wherein the compound is:

$$[CF_3(CF_2)_6\underset{\underset{O}{\|}}{C}NH(CH_2)_3-\underset{\underset{CH_3}{|}}{\overset{\overset{CH_3}{|}}{N^+}}-(CH_2)_3-Si(OC_2H_5)_3]Cl^-$$

* * * * *